United States Patent Office 2,782,933
Patented Feb. 26, 1957

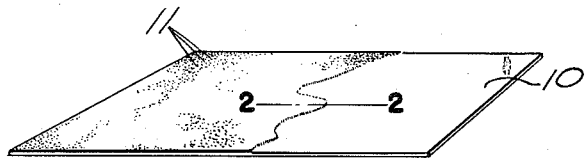
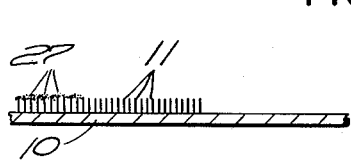
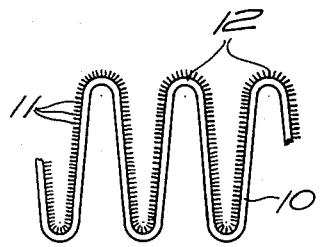
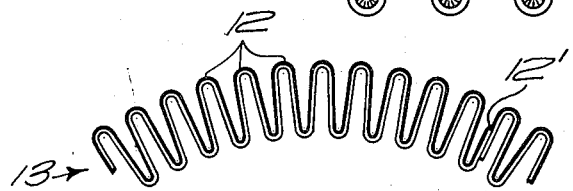
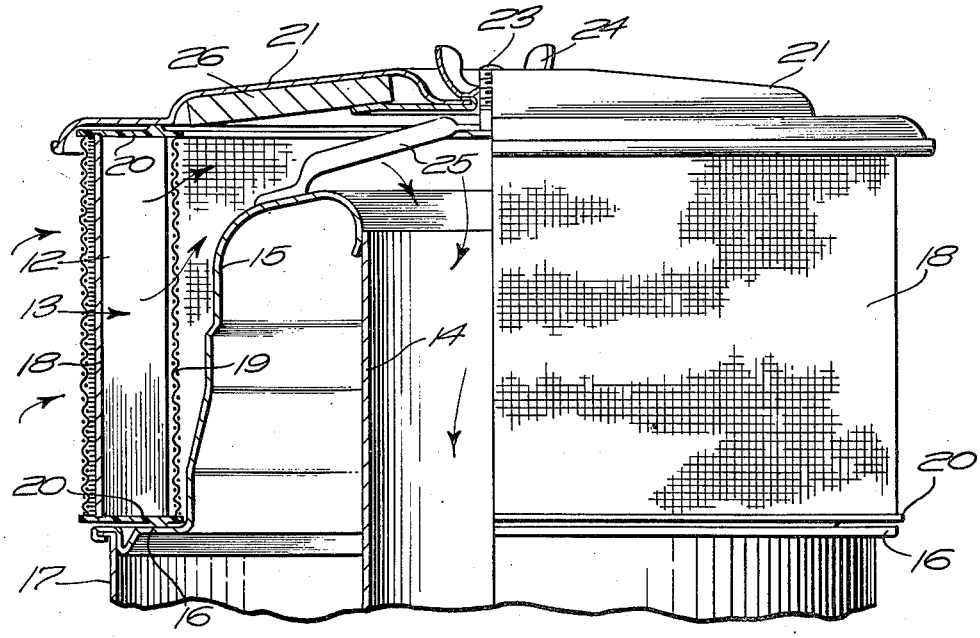
Feb. 26, 1957 — N. MONSARRAT — 2,782,933
FLOCKED FILTER MEDIA
Filed Jan. 4, 1954
FIG. 1
FIG. 2
FIG. 3
FIG. 4
FIG. 5
INVENTOR.
NICHOLAS MONSARRAT
BY
Charles B. Wilson
ATTORNEY

2,782,933
FLOCKED FILTER MEDIA

Nicholas Monsarrat, Seekonk, Mass., assignor to Fram Corporation, Providence, R. I., a corporation of Rhode Island Application January 4, 1954, Serial No. 401,859

2 Claims. (Cl. 210—169)

This invention relates to a novel filter media, and more particularly to a porous web or porous sheet of paper having flock adhesively secured to a face thereof so that the flock fibers stand erect or substantially clear of each other, and do not significantly reduce the permeability of the base sheet.

Filter media, as commonly employed heretofore, may employ (1) depth filtration in which the liquid or gas to be filtered passes through a thick mass of fibrous material, or (2) surface filtration in which the liquid or gas to be filtered passes through a thin porous sheet such as a sheet of paper. Filters may also employ a combination of the depth and surface filtration.

In surface filtration the resistance to the flow of the fluid to be filtered therethrough increases as the pores or apertures of the surface become clogged; and in order to increase the service life of a surface type of filter medium, it has been proposed heretofore to fold the filter sheet back and forth so as to form numerous pleats and thereby increase the amount of the filter sheet that can be used in a limited space.

The present invention relates to a modified surface type of filter media, and more particularly to a supporting porous web or sheet having adhesively secured thereto, throughout its entire area or selected portions thereof, flock particles bonded to such sheet so as not to interfere seriously with the porosity of the sheet, and arranged so that the majority of the flock particles stand substantially erect from the surface of the supporting sheet, or the fibers are substantially clear of each other. The base of the individual fibers are preferably spaced slightly from each other, and the fibers are disposed so that the major portion of each is exposed and presents a surface on which the dust or other contaminant to be removed from the fluid being filtered may lodge. In such a construction where the major portion of each fiber is exposed so that contaminants may be deposited on a large portion of its area, the total sum of such areas greatly exceeds the area of a face of the base sheet before the flock is applied thereto. In such flocked filter area the total surface presented by these individual fibers may be a thousand times as great as the unflocked surface of the supporting sheet.

It will be seen from the foregoing that the purpose of the present invention is to increase materially the effective life of the filter media. When the construction of the present invention is employed, the dust or other contaminant removed during the filtering operation will be deposited primarily on the individual flock fibers, where such contaminant is held in spaced relation to the supporting sheet, and thereby avoid closing the pores of the sheet, to retard clogging the sheet to such an extent that it is no longer effective as a filter medium.

The above and other features of the present invention will be further understood from the following description when read in connection with the accompanying drawing, wherein:

Fig. 1 is a perspective view of a porous sheet of paper having flock secured to a large portion thereof.

Fig. 2, on an enlarged scale, is a sectional view taken on the line 2—2 of Fig. 1.

Fig. 3 is a top plan view showing the flocked paper of Fig. 2 bent to form successive pleats or corrugations.

Fig. 4 shows the pleated, flocked paper of Fig. 3 bent to form an arc of a circle; and Fig. 5 is a side view with parts in section of an air filter casing having the flocked pleated sheet of Fig. 4 mounted therein as a filter cartridge.

The flocked sheet of Fig. 1 comprises a porous web or porous sheet of paper 10 having adhesively secured to one face thereof flock particles 11. For the purpose of the present invention, it is important that the flock particles be spaced slightly from each other and that they be so attached to the base sheet 10 that they will stand substantially erect from a face of such sheet or sufficiently erect to cause the fibers to clear each other to a large degree. The flock filaments may be from one to several millimeters long. A recent development in electrostatic orientation of flock fibers on an adhesive coated surface makes this arrangement of the individual filaments of the flock possible.

It is also important that the flock be so adhered to the porous sheet that the finished flocked sheet will be porous. This can be accomplished by using an adhesive such as phenol formaldehyde and employing a sufficient amount of solvent to render the adhesive quite thin when applied to the base or carrying sheet 10. The length of the flock particles may be from one to several millimeters, and the individual flock filaments should be spaced one from the other slightly to improve the porosity of the flock sheet and also to give the dirt to be separated from the air or liquid stream a better chance to lodge upon the individual filaments, as will be hereinafter more fully explained. The flock 11 may be formed of natural or synthetic fibers, but relatively straight filaments such as fine short rayon filaments are preferred.

The present invention contemplates that the flocked sheet constructed as just described may be employed as a filter medium by placing the same in a flat extended condition as shown in Fig. 1 across an air stream so that the flock particles face upstream. Since, however, it is usually desirable to employ a filter medium, which can be used for a long period of time to filter air without becoming clogged, it is usually desirable to fold the flocked sheet as in Fig. 3 so that a large area of such sheet may be supported in a relatively small space. It is therefore desirable, in many cases, to bend or fold the flocked sheet into successive pleats such as indicated by 12 in Figs. 3 and 4.

Such pleated flocked sheet may be placed in filter casings of various types and shapes. One desirable arrangement of such pleated flocked sheet is shown in Fig. 5 wherein the bent pleated sheet of Fig. 4 forms the cylindrical filter cartridge 13 of Fig. 5 in which the pleats are disposed parallel to the central axis of such cartridge. The ends of this sheet forming the cylinder filter should be secured together as at 12' in Fig. 4.

The flocked filter medium contemplated by the present invention may be employed in various fields to filter gases or liquid, and one important use contemplated for this material is that of an air filter for filtering the air supplied to the carburetor of internal combustion engines. In such air filters it is customary for the air to pass inwardly through the filter medium towards the central axis. In such a construction the flock particles should extend outwardly or in the upstream direction so that the dust laden air will contact the ends of the erect flock filaments 11 before it reaches the porous supporting sheet or base sheet 10.

In order to illustrate one practical use of the filter medium of the present invention, the cylindrical shaped cartridge 13 formed of the pleated sheet of Fig. 4 is positioned in an air filter casing of well-known construction, so that the air from the atmosphere will be drawn inwardly through the filter medium in the direction indicated by the arrows in Fig. 5, by the suction of the operating internal combustion engine.

The construction shown in Fig. 5 of the drawing comprises an intake air conduit 14 which is rigidly secured to a resonating device or shell 15, and this shell has an outwardly extending annular flange 16 which forms a seat that supports the cartridge 13. This shell rests upon and is supported by a tubular casing 17 which is adapted to be attached to and supported by the carburetor, not shown. In order to support the cylindrical shaped cartridge 13 and cause it to retain its arcuate shape of Fig. 4, this pleated cylinder cartridge is placed between an outer annular screen 18 and inner annular screen 19, and the upper and lower ends of the pleated cylinder cartridge preferably have secured thereto a covering ring 20 of rubber-like material, which is firmly bonded to and seals the pleated ends of the cartridge. These rings may also be bonded to the top and bottom edges of the wire screens 18 and 19.

The filter cartridge comprising the pleated flocked material 13 confined between an outer screen 18 and inner screen 19 and having the pleated ends sealed by the rubber-like rings 20 forms an inexpensive filter cartridge capable of operating satisfactorily to filter the air supplied to the engine of a motor vehicle for thousands of miles of travel, and when it becomes so laden with dirt and dust that it is difficult for the air to pass therethrough, it may be discarded and replaced with a new and similar filter cartridge.

In order to secure the filter cartridge 13 in the position in which it is shown in Fig. 5 and to protect it therein, the filter casing is provided with a cover 21 which is preferably bent inwardly near its center as indicated and has a central hole through which a clamping bolt 23 may extend, so that the cover may be clamped in the position in which it is shown by a wing nut 24. This clamping bolt is secured to a spider 25 which bridges the central opening in the filter casing, and the ends of this spider are secured to the upper portion of the shell 15. The inner face of the cover 21 preferably has secured thereto a sound-deadening pad or hiss pad 26.

It has been proposed heretofore to use a porous sheet of paper and to fold the same in pleats so as to produce a pleated cylindrical filter cartridge, but it is found that when such a cartridge is used as a filter medium, the pores of the paper soon become clogged with the dirt and dust removed from the air stream, so that the effective filter life of the same is relatively short.

The flocked filter sheet contemplated by the present invention, and in which the flock filaments extend approximately erect to the surface of the carrying sheet, gives a much longer filtering life than will a cartridge constructed of unflocked porous paper. This is due to the fact that the individual minute filaments extending outwardly from the base sheet in the upstream direction present a great number of minute points upon which the dust particles may lodge in slightly spaced relation to the surface of the carrying sheet, as indicated by 27 in Fig. 2, with the result that a large amount of dust can lodge upon and be supported by these individual flock filaments out of contact with the surface of the carrying sheet. It is found that such flocked sheet can carry a large amount of dust before the porosity of the cartridge constructed as herein contemplated is greatly reduced. In some uses of the flocked sheet of the present invention, it may be desirable to provide such sheet with both flocked areas and unflocked areas.

In testing the air filtering properties of a flocked sheet constructed in accordance with the present invention, a testing device was used having a tube through which air was forced under accurately controlled conditions, and minute particles of dirt consisting largely of silica were fed at a controlled rate into the air stream. A disc was cut from a porous sheet of paper, such as the unflocked sheet indicated by 10 in the drawing, and this was clamped in the above mentioned tube across the dust laden air stream. Tests showed that the porosity of this sheet was relatively high at the start of the test, but that its porosity decreased rapidly as the face of this sheet became covered with dirt, so that the effective filtering life of this sheet was comparatively short. A flocked sheet such as the portion of the sheet 10 covered with flock 11 was then tested, and while it was found that the porosity of the flock sheet at the start of the test was noticeably less than that of the unflocked sheet 10, the porosity of the flocked sheet decreased much more slowly than that of the unflocked sheet 10. These tests showed that the effective filtering life of a flocked sheet having the flock standing approximately erect to the face of the sheet as herein contemplated was much longer than that of the unflocked sheet 10.

The oil filtering properties of flocked paper such as above described have been tested to determine its superiority over unflocked paper. To this end, a disc of flocked paper constructed as above described and covered with flock 1.5 millimeters long and a disc of unflocked paper, both having the same porosity, were used in the test. Each disc was clamped in a testing device, and oil carrying a measured quantity of fine dust particles was forced therethrough under controlled conditions. Repeated tests showed that the flocked sample had a dirt capacity thirty-seven percent (37%) greater than the unflocked sample.

It will be seen from the foregoing that the present invention provides an inexpensive and easily constructed filter cartridge for use to filter gaseous or liquid fluids, and that the same is capable of giving long service before it becomes so laden with dirt that it need be replaced.

Having thus described my invention, what I claim and desire to protect by Letters Patent is:

1. A filter for filtering fluids, comprising a casing constructed for the passage therethrough of a fluid to be filtered, an annular filter element in said casing formed of a flocked sheet of porous paper that is pleated and arranged in an annulus with the pleats extending longitudinally thereof so that the fluid is filtered by passing through the pores of the paper, said sheet having flock filaments adhesively secured thereto so as not to seriously reduce the porosity of the paper and disposed in slightly spaced relation to each other with the individual filaments extending approximately erect from the face of the paper and in the up stream direction, whereby dirt in the stream will lodge primarily on the ends of the individual filaments out of contact with the surface of the paper and thereby help prevent clogging of the porous paper.

2. A filter as defined in claim 1 wherein the flocked sheet has its pleats disposed in spaced relation to each other.

References Cited in the file of this patent

UNITED STATES PATENTS

| | | |
|---|---|---|
| 2,076,980 | Cooper | Apr. 13, 1937 |
| 2,221,338 | Wintermute | Nov. 12, 1940 |
| 2,425,235 | Ferrante | Aug. 5, 1947 |
| 2,463,722 | Spraragen | Mar. 8, 1949 |
| 2,584,551 | Chambers et al. | Feb. 5, 1952 |
| 2,681,036 | Ewing et al. | June 15, 1954 |

FOREIGN PATENTS

| | | |
|---|---|---|
| 339,913 | Great Britain | Dec. 13, 1930 |
| 680,211 | Great Britain | Oct. 1, 1952 |